W. W. CAMERON.
TRACTOR PLOW.
APPLICATION FILED APR. 25, 1914.

1,377,057.

Patented May 3, 1921.
7 SHEETS—SHEET 3.

W. W. CAMERON.
TRACTOR PLOW.
APPLICATION FILED APR. 25, 1914.

1,377,057.

Patented May 3, 1921.
7 SHEETS—SHEET 7.

UNITED STATES PATENT OFFICE.

WILLIAM W. CAMERON, OF LA CROSSE, WISCONSIN, ASSIGNOR, BY MESNE ASSIGN-
MENTS, TO FRED GERLACH AND ARNOLD B. KELLER, TRUSTEES, OF CHICAGO,
ILLINOIS.

TRACTOR-PLOW.

1,377,057.  Specification of Letters Patent.  Patented May 3, 1921.

Application filed April 25, 1914. Serial No. 834,312.

*To all whom it may concern:*

Be it known that I, WILLIAM W. CAM-ERON, a resident of La Crosse, in the county of La Crosse and State of Wisconsin, have invented certain new and useful Improvements in Tractor-Plows, of which the following is a full, clear, and exact description.

The invention relates to tractor plows.

One object of the invention is to provide an improved power lift for a plow in which a crank shaft, sustained between two of the ground wheels, serves to raise and lower the plows without a separate supporting frame between the front and rear carrying wheels.

A further object of the invention is to provide an improved plow in which a crank-axle at the front serves to conjointly support and operate the plow-carrying structure or beam, so that the necessity of separately connecting the plow beam to a carrying-frame may be dispensed with.

The invention further designs to provide improved power-operated plow-shifting mechanism which may be used in conjunction with adjusting devices for adjusting the plow-bottoms laterally and longitudinally.

The invention further designs to provide an adjustable stop-device for limiting the swing of the trail wheel which is automatically shifted when the plows are raised or lowered.

A further object of the invention is to provide power-operated plow-shifting mechanism which is simple in construction.

The invention consists in the several novel features hereinafter set forth and more particularly defined by claims at the conclusion hereof.

Figure 1:
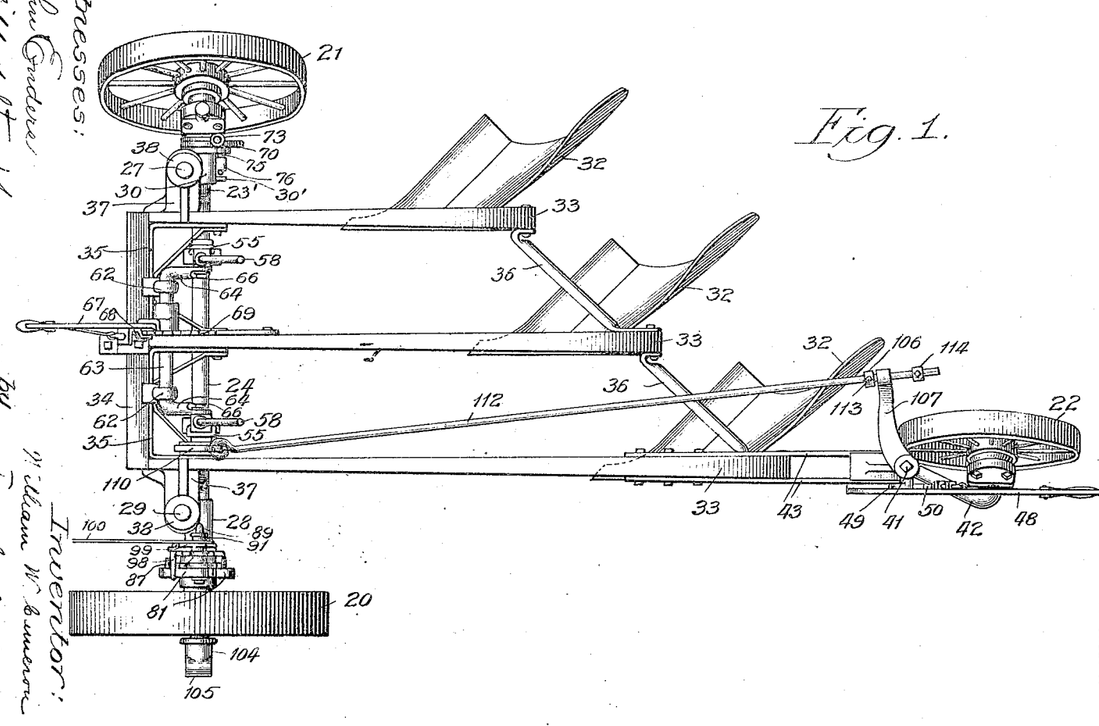
Figure 1 is a plan of a plow embodying the invention.
Figure 2:
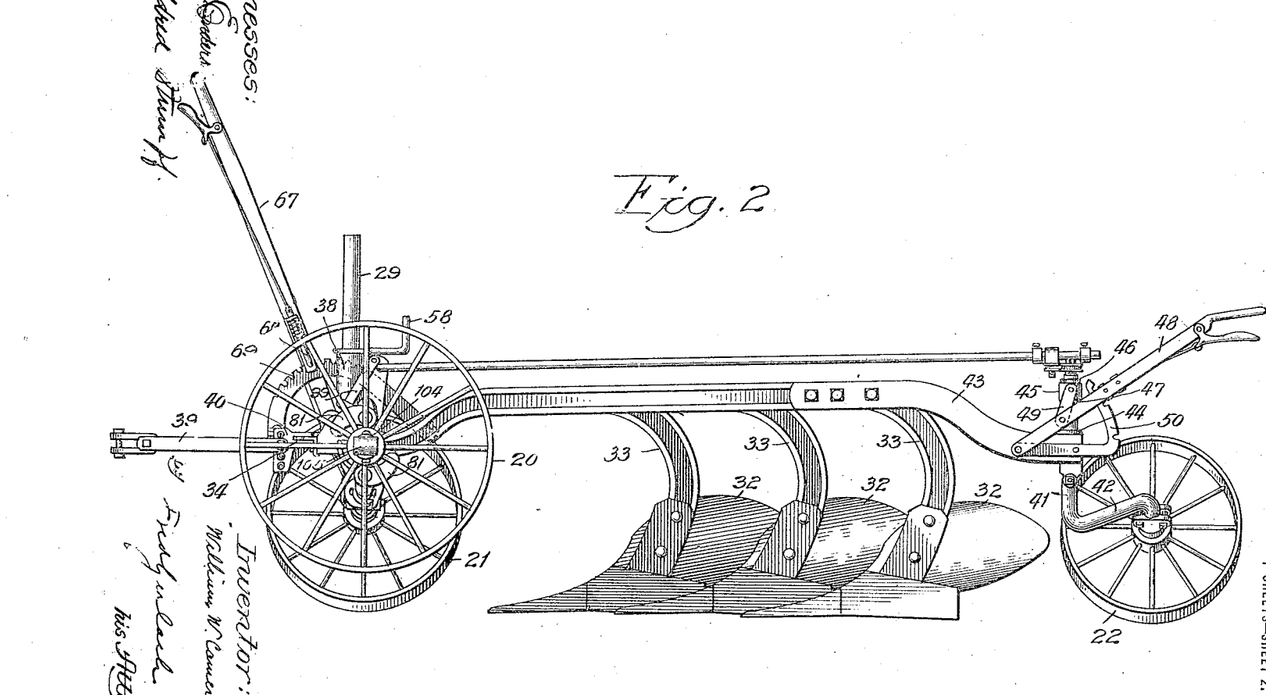
Fig. 2 is a side elevation.
Figure 3:
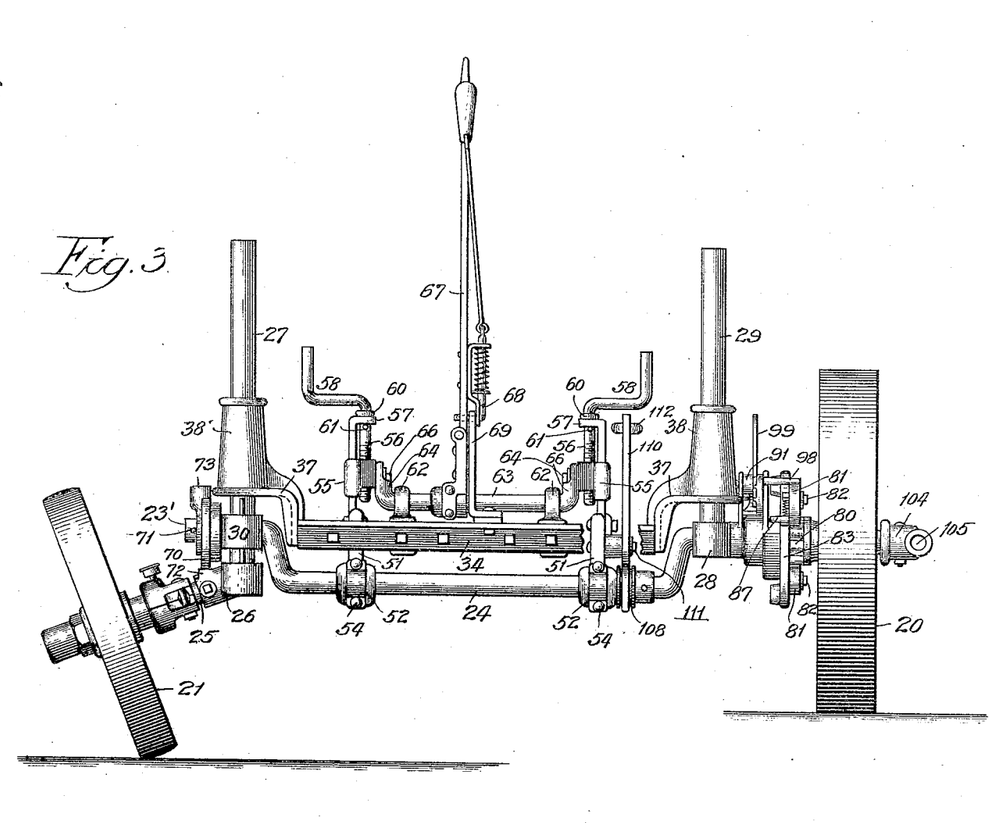
Fig. 3 is a front elevation.
Figure 4:
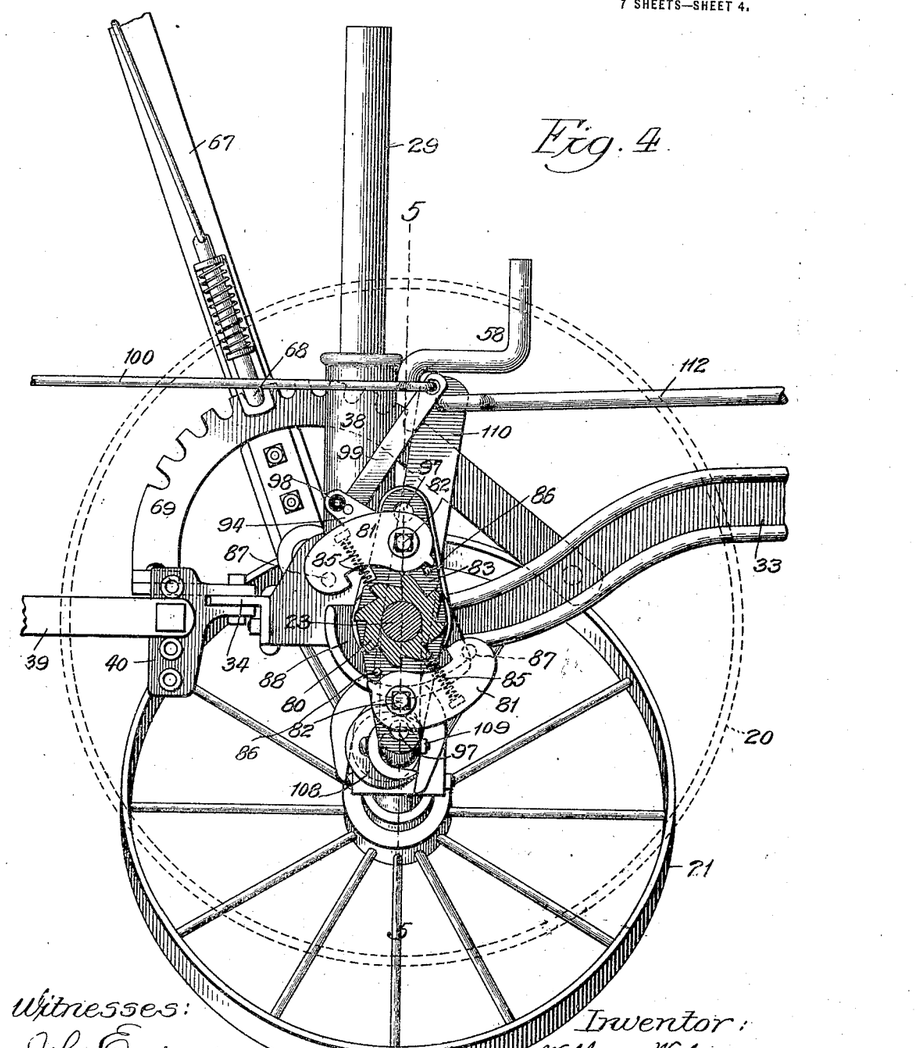
Fig. 4 is a side elevation, partly in section, showing the power-lift mechanism.

The plow comprises a land-wheel 20, a side furrow-wheel 21 and a dirigible rear or trail furrow-wheel 22, which serve to sustain the plowshares and the supporting structure therefor and the plow-shifting mechanism. One end 23 of a crank-axle 24 is journaled in the hub of land-wheel 20. A stub-axle 25 (Fig. 3) is mounted in the hub of furrow-wheel 21 and is angled, as well understood in the art, to render said furrow-wheel effective in overcoming side-pressure. Axle 25 is adjustably and rigidly secured in a bracket 26 and a standard 27 is rigidly secured in said bracket. A bracket 28 is mounted on the side-portion 23 of crank-axle 24 and a standard 29 is rigidly secured in, and rises from, said bracket. The opposite end 23' of crank-axle 24, which is coaxial with the axle-portion 23, is journaled in a collar 30 which is vertically adjustable and slidable on standard 27, for a purpose hereinafter set forth, and is supported upon bracket 26. The land-wheel 20, crank-axle 24, stub-axle 25, furrow-wheel 21 and standards 27, 29, serve as a supporting structure for the front of the machine.

Plowshares 32 in any desired number, are rigidly secured to beams 33 respectively, and the front ends of these beams are cross-connected by a front rail or angle-bar 34 and braces 35. Braces 36 secure the rear ends of the plow-beams together. These beams and their connections serve as a structure for carrying the plowshares. The front end of this plow-carrying structure is operatively connected to the crank-shaft 24, whereby the plows may be raised and lowered as hereinafter set forth. At each side of the plow-carrying structure, a bracket 37 is secured and each of these brackets is provided with a sleeve or guide 38 through which the standards 27, 29, which are sustained by the crank-axle, pass. These sleeves and standards constitute a sliding connection between the wheel-supported front structure and the plow-carrying structure which permits the latter to be raised and lowered by the crank-axle, and whereby both of said structures will be connected so as to be drawn forwardly together by the pulling force, and so that the crank-axle of the front carrying-structure may be utilized to raise and lower the plow-carrying structure. A traction bar 39 is connected to a clevis 40, which is suitably connected to the front rail or bar 34. By means of the sliding connection between the sleeves 38 and standards 27, 29, the front supporting structure will be drawn forwardly with the plow-supporting structure to which power is applied. The front end of traction-bar 39 is adapted to be connected to a tractor in manner well understood in the art. The rear of the plow-supporting structure is sustained by a standard 41 which has an arm 42 on its lower end which has a laterally extending terminal journaled in the trail-wheel 22. Bars 43, which are rigidly secured to and extend rearwardly from one of the plow-beams 33, have rigidly secured thereto, a collar 44 which is adapted to slide vertically on standard 41. A collar 45, in which standard 41 is rotatable, and which is confined against vertical movement on said standard by collars 46, 47, above and below collar 45 respectively, is adjustably connected to bars 43 of the plow-carrying structure by means of hand-lever 48, a link 49 and a rack 50 to which lever 48 is adapted to be locked. By adjustment of lever 48, the rear of the plow-carrying structure may be adjusted vertically to raise or lower the plows in the ground, and by locking lever 48 in its lowermost position on the rack, the rear portion of the plow-carrying structure may be held raised so that the plows, in conjunction with the mechanism for raising the front of the carrying-structure, will cause the plows to be raised from the ground, as desired in transporting the plow from place to place.

Crank-axle 24 is connected to raise and lower the front end of the plow-carrying structure so that when the crank-portion of the axle is lowered, the plow-carrying structure will be lowered, and so that when the crank-axle is turned to raise the crank-portion, the plow-carrying structure will be correspondingly shifted. The shifting connection between the crank-axle and the plow-carrying structure comprises a pair of links 51, the lower ends of which are provided with boxings 52 whereby they are pivotally connected to the crank-axle. These boxings are preferably formed of sections secured together by bolts 54 so that the links can be pivotally connected to the crank-axle after the crank has been formed on the axle. A block 55 is slidable on and adjustably connected to each link 51 by means of a screw 56 which is journaled in an offset lug 57 of the link. Each screw 56 is provided at its upper end with a crank 58 by which it may be turned to raise or lower the block 55 to which it is connected by its screw-thread, and is held against vertical movement relatively to its link by a shoulder 60, above lug 57, and a pin 61 below said lug. Brackets 62 are rigidly secured to front-rail 34 of the plow-carrying structure, and a shaft 63 is journaled in said brackets. Cranks 64 at the outer ends of shaft 63 respectively, are pivoted to studs 65 on blocks 55 respectively. Nuts 66 on the outer ends of studs 65 respectively, hold the studs in the crank-ends 64. A hand-lever 67 is rigidly secured to shaft 63, and is provided with a lock 68, whereby the lever may be locked in different positions on a rack 69 which is rigidly secured to the plow-carrying structure.

The purpose of providing hand-lever 67 is to make it possible to raise the front end of the plow-carrying structure manually, if the plow is not in operation and also to regulate the depth of the plow-points. The purpose of providing screw-cranks 58 is to permit either side of the plow-carrying structure to be adjusted vertically to level or wing the plows.

As an additional means for adjusting the plow-carrying structure laterally, an eccentric 70 is mounted on end 23' of the crank-axle, being held thereon by a pin 71, and this eccentric bears upon an abutment 72 on bracket 26. This eccentric is formed with a socket 73 adapted to receive a bar or round of iron, serving as a lever, for the purpose of turning the eccentric to raise or lower one end of the crank-axle relatively to the side furrow-wheel 21. The eccentric is also formed with a series of holes or recesses 74 adapted to receive a pin 75 which is slidably held in a lug 76 on collar 30, whereby the eccentric may be locked against rotation and in assigned position. Pin 75 is provided with an angular end 75' which is normally positioned so as to engage a lug 30' on bracket 30 to prevent accidental withdrawal of the pin from holes 74. By turning the angular end 75' out of the line of lug 30', the pin may be withdrawn from the disk. Eccentric 70 is journaled on a boss 30ª on bracket 30. Thus, by rotating the eccentric 70, the end 23' of the crank-axle 24 may be adjusted, and such adjustment will cause the plow-carrying structure and crank-axle to be adjusted laterally, as desired. To permit angular adjustment of the carrying-structure by eccentric 70 or screws 53, the openings in sleeves 38 are flared downwardly and laterally, as at 78.

Mechanism is provided for operating the crank-axle by power derived from one of the ground-wheels to raise the plows out of the ground and to lower them into it. A ratchet-wheel 80 is secured to rotate with the land-wheel 20 in which is mounted the axle-end 23. In utilizing the crank on the wheel-axle to raise and lower the plow-carrying structure by power, the crank is operated 180° or one-half a revolution to lower the plows into the ground and a half revolution to raise them out of the ground, the crank being operated in the same direction in which the ground-wheel is driven when lowering the plows and when raising them. The power-lift mechanism comprises a pair of dogs 81, each pivoted, as at 82, at diametrically opposite points to the side of a double-armed lever 83 which is secured to the axle portion 23 by a key 84, so as to rotate the axle and so as to hold the axle against rotation when the lever is locked. Each dog 81 is normally held disengaged from ratchet 80 by a spring 85 applied between the dog and lever 83. Stops 86 on lever 83 limit the outward movement of the dogs by springs 85. Each dog is provided with an inwardly extending stud 87 which is adapted to enter a segmental groove 88 formed in an extension of bracket 28 to successively hold the dogs in engagement with the ratchet until a full half revolution has been imparted to the lever and crank-axle. Lever 83 is normally locked against rotation to secure the crank-axle against rotation by a locking-bolt 89, which is normally and yieldingly held in operative position and in one of the holes 97, by a spring 90 and is slidably held in an extension 91 on bracket 28 to which standard 29 is secured. Bolt 89 is U-shaped and comprises an arm 92 which is also guided in extension 91 and slidable therein.

A controlling-lever 94 for shifting the dogs 81 into engagement with the ratchet-wheel and for preliminarily releasing the lock 89, is pivoted to extension 91 by a bolt 95 and is provided with a cam 96, which is adapted to engage arm 92 of bolt 89 to withdraw the bolt from the openings 97 in lever 83. Lever 94 is also provided with a stud 98 which is normally out of the path of dogs 81, and adapted to shift the uppermost dog into engagement with ratchet 80 against the force of its spring 85 after lock 89 has been withdrawn from engagement with lever 83. An arm 99 is secured to lever 94 and a rod or cable 100 is connected to the upper end of said arm and extends to a convenient position on the tractor. To cause lock-bolt 89 to automatically pass into the openings 97, during rotation of lever 83, inclined surfaces 101 are formed on said lever which will force the locking-dog out of the path of the lever and into position to slip into the holes 97.

Figure 5:
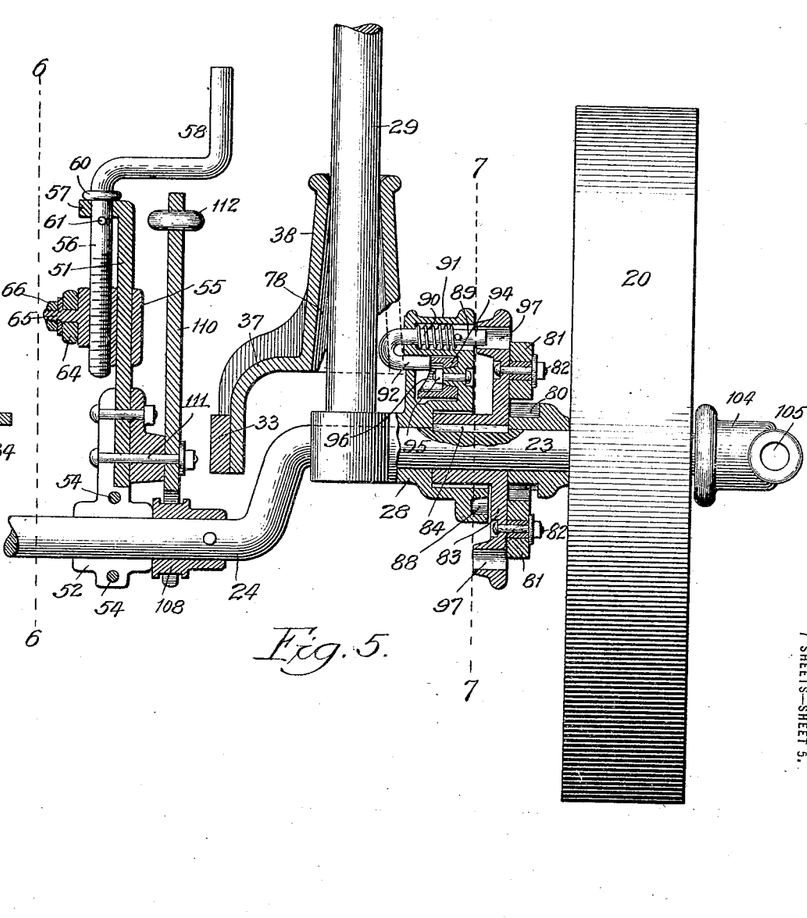
Fig. 5 is a section taken on line 5—5 of Fig. 4.
Figure 6:
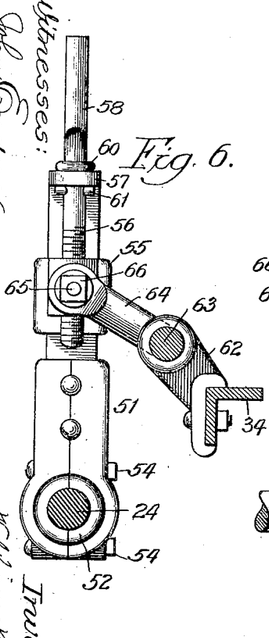
Fig. 6 is a section taken on line 6—6 of Fig. 5.
Figure 7:
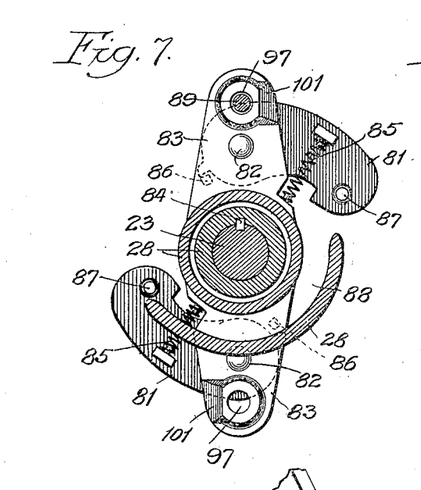
Fig. 7 is a section taken on line 7—7 of Fig. 5.
Figure 8:
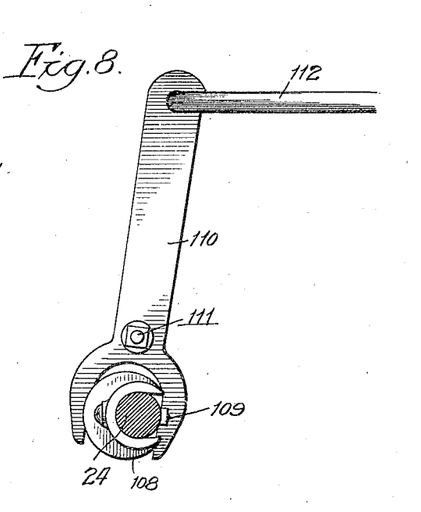
Fig. 8 is a detail of the device for automatically shifting the steering connection for the rear carrying-wheel.
Figure 9:
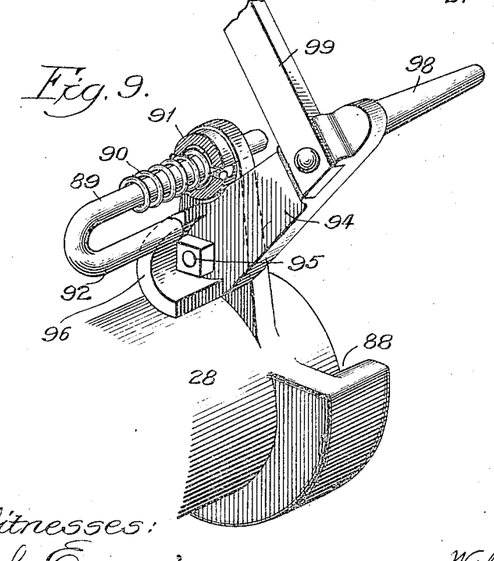
Fig. 9 is a perspective of the lever for controlling the locking device for the power-lift.
Figure 10:
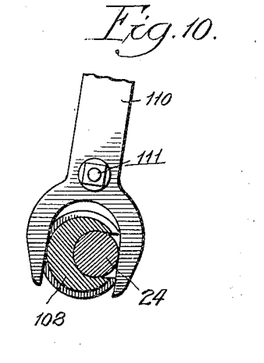
Fig. 10 is a detail of the eccentric for controlling the steering connection.
Figure 11:
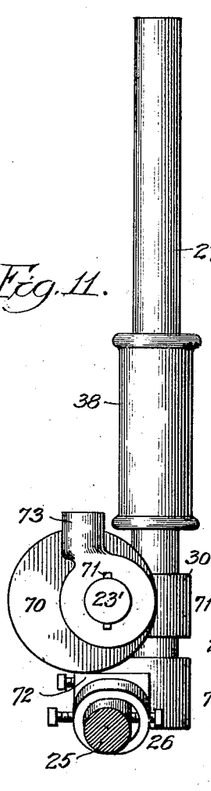
Fig. 11 is a side elevation of the eccentric device for adjusting one end of the crank-axle.
Figure 12:
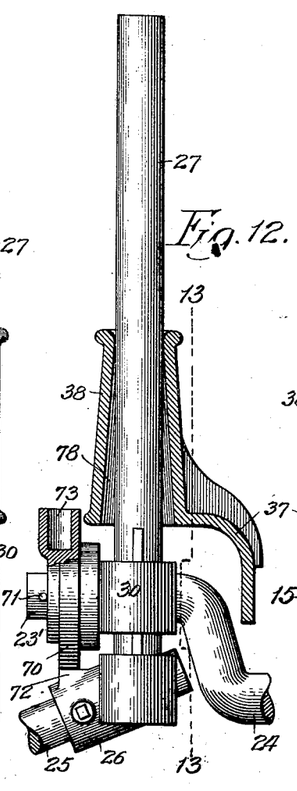
Fig. 12 is a front view, parts being shown in section.
Figure 13:
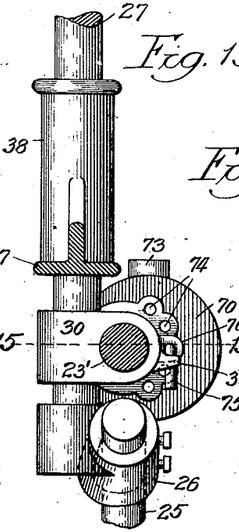
Fig. 13 is a section taken on line 13—13 of Fig. 12.
Figure 14:
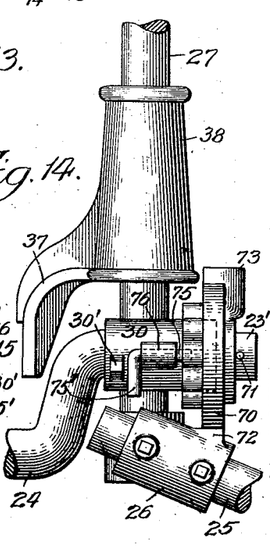
Fig. 14 is a rear elevation of said eccentric adjusting device.
Figure 15:
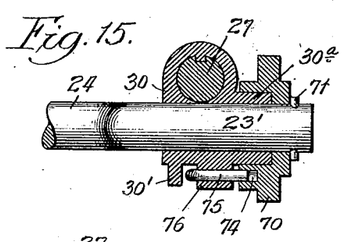
Fig. 15 is a section taken on line 15—15 of Fig. 13.

The operation of the power-lift mechanism will be as follows: Assuming the plows to be lowered, and the crank-axle 24 to be in position shown in Figs. 3 and 5, the operator on the tractor will pull cable 100 when it is desired to raise the plows. This pull will cause lever 94 to rotate cam 96 which will withdraw bolt 89 from opening 97 in said lever and thus release or unlock the crank-shaft. After arm 94 has released the lock, stud 98 will force the upper dog 81 into engagement with ratchet 80. The rotation of the land-wheel 20 will operate ratchet 80, and said dog together, stud 87 on said dog passing into groove 88 so that the dog will remain in engagement with said ratchet until the crank has been shifted a half revolution. Then lock-bolt 89 will pass into the hole 97 upon the opposite end of lever 83 and automatically lock the crank-shaft in position to hold its crank raised. This operation of the crank-shaft will cause links 51 to raise blocks 55, crank 64, crank-shaft 63 and the front plow-supporting structure to which said shaft is connected, and thus raise the plows on said structure out of the ground.

When the plows are in raised position and the crank-shaft is locked, a pull upon cable 100 will similarly operate the dog 81 which is then at the upper end of lever 83 after releasing the lock 89. A half revolution will again be imparted to crank-shaft 24 which will lower links 51 to lower the front end of the plow-carrying structure, whereupon the lever 83 will again be locked.

In practice, it is sometimes desirable to operate the crank-axle manually and for this purpose a collar 104 is fixed on the end 23 of the crank-axle, and this collar is formed with a socket 105 which is adapted to receive a removable lever or bar which may be conveniently carried on the tractor, and when a lever is inserted on the socket, power may be applied to operate the crank-axle to raise or lower the plow-carrying structure.

In practice, the standard 41, which swings with the trail-wheel is dirigibly mounted to facilitate the turning of a corner and a stop-device is necessary to prevent the wheel from turning toward land as the result of the side pressure upon the plowshares. To offset this tendency, a stop 106 is provided for an arm 107 on standard 41. It is desirable, however, when the plows are out of the ground to rectify the position of the rear furrow-wheel so that it will not tend to direct the rear end of the plow away from land. The present invention provides power-operated means for operating this stop 106 so that it will be operated to position the wheel 22 to overcome side-pressure when the plows are in the ground and to permit the wheel to travel forwardly in a straight line when the plows are out of the ground. This power-operated device comprises an eccentric 108 which is secured to the crank-portion of axle 24 by a bolt 109, a lever 110 which is forked around said eccentric and is pivoted, as at 111, to one of the lifting-links 51. A rod 112 is pivoted to the upper end of lever 110 and extends through an eye on the end of arm 107. Stop 106 is adjustably secured by a screw 113 to rod 112. A stop 114 is adjustably secured to rod 112 to limit the rearward swinging of the furrow-wheel in turning a corner. When crank-shaft 24 is locked in lowered position, eccentric 108 will hold lever 110, so that stop 106 will be correctly positioned to hold wheel 22 angled to overcome side pressure. When the crank-shaft is shifted to raise the plows, eccentric 108 on the crank-shaft will cause lever 110 to swing about its pivot 111 so that rod 112 will be operated forwardly to correspondingly operate stop 106. Resultantly, when the crank-shaft is operated to raise the plows, stop 106 will also be operated to control the position of the rear furrow-wheel 22, so that it will not tend to crowd the plow away from land and will permit the the plow to travel according to the direction of the pull.

If it is desired to raise or lower the plow-carrying structure when the machine is stationary, the operator may insert a lever into the socket 105 and pull cable 100 to release lever 83, and then operate the lever in said socket to turn the crank-shaft a half revolution, and until it will be automatically locked by bolt 89.

If it is desired to adjust the front of the plow-carrying structure to give all of the plow-bottoms more or less pitch, this may be done by adjusting lever 67 along rack 69. If it is desired to adjust the plow-bottoms laterally, this may be done by adjusting eccentric 70 to raise or lower the furrow-side end of the crank-shaft 24, or by adjustment of the screw-cranks 58.

It will be observed that the crank 24 extends vertically downward from its axis when the plows are lowered and that the crank will be locked at a point 180° from said position when the power lift has shifted the crank to raise the plow. In each of these positions, the links 51 will be vertical or alined with the crank so that these parts will be in dead-center relation, because the pivot 65 is normally the effective point of connection between the supporting structure or frame and the link. Therefore, this structure exemplifies one in which a rotatable lifting element and a link are alternately operated into dead-center positions.

The invention thus exemplifies an improved power-lift plow, in which a separate supporting-frame between the front and rear carrying-wheels is dispensed with; in which a crank-axle serves to sustain the front of the plow-carrying structure and to raise and lower it; in which provision is made for adjusting the plow-points vertically by means of a hand-lever; in which provision is also made for adjusting the plow-bottoms laterally, and in which provision is made for operating the lifting-mechanism manually by a lever which may be carried on the tractor.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a plow, the combination of a plow-carrying structure, a supporting structure comprising carrying wheels at the sides of the carrying structure respectively, a holding connection between the supporting structure and the front of the carrying structure whereby the structures will be held in connected relation and which permits vertical movement of the front of the carrying structure relatively to the carrying wheels, a rotatable lifting element on the supporting structure, and mechanism for rotating said element operable by power from one of said carrying wheels, said lifting element being separate from the holding connection and connected to shift the carrying structure independently of the holding connection.

2. In a plow, the combination of a plow-carrying structure, a supporting structure comprising carrying wheels at the sides of the carrying structure respectively, a holding connection between the supporting structure and the front of the carrying structure whereby the structures will be held in connected relation and which permits vertical movement of the front of the carrying structure relatively to the carrying wheels, a rotatable lifting element on the supporting structure, mechanism for rotating said element operable by power from one of said carrying wheels, and an operating connection between said lifting element and the carrying structure in addition to the holding connection.

3. In a plow, the combination of a plow-carrying structure comprising a plurality of rigidly connected beams and having a plurality of plow bodies rigidly secured thereto, a supporting structure comprising wheels at the sides of the carrying structure respectively, a holding connection between the supporting structure and the front carrying structure whereby they will be maintained in connected fore and aft relation and which permits vertical movement of the front of the carrying structure relatively to the carrying wheels, a rotatable lifting element on the supporting structure, mechanism operable by power from one of said carrying wheels for rotating said element, and means additional to said holding connection between said rotatable element and the carrying structure to raise both sides of the carrying structure independently of the holding connection.

4. In a plow, the combination of a plow-carrying structure, a supporting structure comprising carrying wheels at the sides respectively and an axle extending between said wheels, a holding connection between the supporting structure and the front of the carrying structure whereby they will be held in connected fore and aft relation and which permits vertical movement of the front of the carrying structure relatively to the carrying wheels, a rotatable lifting element on the axle of said supporting structure, connected to shift the front of the carrying structure independently of the holding connection and mechanism for rotating said element operable by power from one of said carrying wheels.

5. In a plow, the combination of a plow-carrying structure, a supporting structure comprising carrying wheels at the sides respectively and an axle extending between said wheels, a holding connection between the supporting structure and the front of the carrying structure whereby they will be held in connected fore and aft relation and which permits vertical movement of the front of the carrying structure relatively to the carrying wheels, a crank on said axle connected to shift the carrying structure and in addition to said holding connection, and mechanism for rotating the axle operable by power from one of said carrying wheels.

6. In a plow, the combination of a plow carrying structure, a supporting structure comprising carrying wheels at the sides respectively and an axle extending between said wheels, a holding connection between the supporting structure and the front of the carrying structure whereby they will be held in connected fore and aft relation and which permits vertical movement of the front of the carrying structure relatively to the carrying wheels, a rotatable lifting element on the supporting structure, a link connecting said element and the front of the carrying structure, additional to the holding connection, and mechanism for rotating said element operable by power from one of said carrying wheels.

7. In a plow, the combination of a plow-carrying structure, a supporting structure comprising carrying wheels at the sides respectively, a connection between the supporting structure and the front of the carrying structure whereby they will be held in connected relation and which permits movement of the carrying structure relatively to the carrying wheels, a rotatable lifting element on the supporting structure, mechanism for rotating said element, operable by power from one of said carrying wheels, and a lifting connection between said lifting element and the front of the carrying structure comprising a lever whereby the lifting connection may be adjusted.

8. In a plow, the combination of a supporting structure, comprising carrying-wheels, a crank-axle, and members in which the ends of the crank-axle are respectively journaled, an adjustable connection between one of the wheels and one of said members, a plow-carrying structure, a link pivotally connected to the crank and to the front end of the plow-carrying structure and vertically shiftable by the crank, means permitting vertical shift of the carrying structure and for holding the supporting structure and carrying structure in connected relation, and mechanism operated by one of said wheels for operating the crank to shift the carrying structure.

9. In a plow, the combination of a plow-carrying structure, a supporting structure comprising carrying wheels at the sides of the carrying structure respectively, a holding connection between the supporting structure and the front of the carrying structure, whereby the structures will be held in fore and aft relation and which permits vertical movement of the front of the carrying structure relatively to the carrying wheels, a rotatable lifting element on the supporting structure, mechanism for rotating said element, operable by power from one of said carrying wheels, and a lifting connection between said element and the front of the carrying structure, said lifting element and connection being adapted to alternately raise and lower the plow-carrying tructure by rotation of said element in the same direction.

10. In a plow, the combination of a plow-carrying structure, a supporting structure comprising carrying wheels at the sides respectively and an axle extending between said wheels, a holding connection between the supporting structure and the front of the carrying structure whereby they will be held in connected fore and aft relation and which permits vertical movement of the front of the carrying structure relatively to the carrying-wheels, a crank on said axle, mechanism for rotating the crank operable by power from one of said carrying wheels, and a lifting connection between the crank and the front of the carrying structure, said lifting connection and element being adapted to alternately raise and lower the carrying structure by rotation of the crank in one direction.

11. In a plow, the combination of a plow-carrying structure having a plurality of plow-bodies rigidly secured thereto, a supporting structure comprising wheels at the sides respectively, a plurality of connections at the sides respectively whereby they will be held in connected relation and which permit vertical movement of the carrying structure relatively to the carrying wheels, a rotating lifting element on the supporting structure, and mechanism for rotating said element operable by power from one of said carrying wheels, said element being connected to lift the front of the carrying structure independently of said holding connections.

12. In a plow, the combination of a plow-carrying structure having a plurality of plow bodies rigidly secured thereto, a supporting structure comprising wheels at the sides respectively, a plurality of connections at the sides respectively whereby they will be held in connected relation and which permit vertical movement of the carrying structure relatively to the carrying wheels, rotatable means on the supporting structure, mechanism for rotating said element operable by power from one of said carrying wheels, and a plurality of connections between said rotatable means and the front of the carrying structure, additional to the holding connections and adapted to lift both sides of the front of the carrying structures.

13. In a plow, the combination of a supporting structure comprising carrying wheels at its sides, a crank-axle having one of its ends held in one of the carrying wheels, and members on the ends of the crank-axle respectively, a plow-carrying structure having its front end connected to and vertically shiftable by said crank-axle, a connection permitting vertical movement of the carrying structure and between the members of the supporting structure and carrying-structure for holding them in connected relation, and means operated by the carrying-wheel around the crank axle for operating the crank to raise and lower the carrying structure, and an adjustable connection between one of said members and the other carrying wheel.

14. In a plow, the combination of a plow-carrying structure having a plurality of plow-bodies fixedly secured thereto, a supporting structure comprising carrying wheels at the sides respectively, a connection whereby the structures will be held in connected relation and which permits vertical movement of the carrying structure relatively to the carrying wheels, a rotatable lifting element on the supporting structure, mechanism for rotating said element operable by power from one of said carrying wheels, said element being connected to lift the front of the carrying structure independently of the holding connection, and means for automatically locking the element in two positions to alternately secure the carrying structure in raised or lowered position.

15. In a plow, the combination of a supporting structure having a plurality of plow bodies secured thereto and comprising a plurality of carrying wheels and an axle between said wheels, a rotatable lifting element on the supporting structure, a plow-carrying structure, a slidable connection between the structures for holding them in connected fore-and-aft relation, which permits vertical movement of the carrying structure and mechanism operable by power from one of said carrying wheels for rotating said element to raise the carrying structure relatively to the supporting structure.

16. In a plow, the combination of a pair of front carrying wheels, a rear carrying wheel, a supporting structure sustained by and extending between the front carrying wheels, a plow-carrying structure sustained at its rear by said rear wheel, a connection between the said supporting-structure and the front end of the carrying-structure for lifting the latter vertically, a connection between said structures permitting vertical movement of the front end of the plow-carrying structure and whereby the structures will be held in connected relation.

17. In a plow, the combination of a pair of front carrying wheels, a rear carrying wheel, a supporting structure comprising a crank-axle sustained by and between the front carrying wheels, a plow-carrying structure sustained at its rear by said rear wheel, a link-connection between the said crank-axle and the carrying structure for shifting the latter, a connection between said structures, permitting vertical movement of the plow-carrying structure and whereby the structures will be held together for fore and aft travel.

18. In a plow, the combination of a pair of front carrying wheels, a rear carrying wheel, a supporting structure sustained by and extending between the front carrying-wheels, and comprising a crank-axle, a plow-carrying structure sustained at its rear by said rear wheel, a shifting-connection between said crank-axle and the carrying-structure for lifting the latter, a connection between said structures permitting vertical movement of the plow-carrying structure and whereby the structures will be held together for fore and aft travel, and mechanism operable by one of the front carrying-wheels for operating the crank-axle.

19. In a plow, the combination of carrying-wheels, a plow-carrying structure, a supporting-structure sustained by said carrying-wheels, a sliding connection between said structures, mechanism operable by one of the carrying-wheels for shifting the plow-carrying structure, comprising a crank-shaft mounted in one of the carrying-wheels and to rotate coaxially with said latter wheel, and means for locking said shaft against rotation.

20. In a plow, the combination of carrying-wheels, a plow-carrying structure, a supporting-structure sustained by said carrying-wheels, a sliding-connection between said structures, and power-operated mechanism for shifting the plow-carrying structure, comprising a crank-shaft and a link-connection between said shaft and the plow-carrying structure.

21. In a plow, the combination of carrying-wheels, a plow-carrying structure, a supporting structure extending between and sustained by said carrying-wheels, a sliding-connection between said structures, a lifting-connection between the front end of the carrying-structure and the supporting structure, and mechanism operable by one of the carrying-wheels for operating the lifting-connection comprising a crank-shaft on the supporting-structure and a link-connection between said crank-shaft and the plow-carrying structure.

22. In a plow, the combination of a pair of front carrying-wheels, a supporting-structure between and sustained by said front wheels, a plow-carrying structure, a sliding-connection between said structures, a connection sustained by the supporting-structure for shifting and sustaining the front end of the carrying-structure, and mechanism operable by one of the carrying-wheels for operating the shifting-connection, the latter comprising a crank-shaft and a link.

23. In a plow, the combination of a pair of front carrying-wheels, a supporting-structure between and sustained by said front wheels, a plow-carrying structure, a sliding-connection between said structures, a crank and link connection for shifting and sustaining the carrying-structure, mechanism operable by one of the carrying-wheels for operating the link-connection, and means for locking said connection.

24. In a plow, the combination of front carrying-wheels, a crank-axle between said wheels, a plow-carrying structure, standards on the axle, a slidable connection between the plow-carrying structure and said standards, a lifting and sustaining connection between the axle and the carrying-structure, and mechanism operable by one of the wheels for operating the axle.

25. In a plow, the combination of front carrying-wheels, a crank-axle between said wheels, a plow-carrying structure, standards on the axle, a slidable connection between the plow-carrying structure and said standards, a lifting and sustaining connection between said axle and the front end of the carrying structure, and mechanism operable by one of the wheels for operating the crank-axle.

26. In a plow, the combination of front carrying-wheels, a crank-axle between said wheels, a plow-carrying structure, standards on the axle, a slidable connection between the plow-carrying structure and said standards, a lifting-connection between the axle and the carrying-structure, mechanism operable by one of the carrying-wheels for operating the axle, and an automatic lock for the axle.

27. In a plow, the combination of a pair of front carrying-wheels, a supporting structure sustained entirely by said front wheels, a rear carrying-wheel, a plow-carrying structure sustained at its rear by said rear wheel, a combined sustaining and lifting connection between the supporting structure and the front of the carrying-structure, a vertical sliding connection between the structures whereby they will be held against relative fore and aft movement, and power-operated mechanism for operating said lifting connection, comprising a crank-axle on the carrying-structure.

28. In a plow, the combination of a pair of front carrying-wheels, a supporting-structure sustained by said front-wheels, a rear carrying-wheel, a plow-carrying structure sustained at its rear by said rear wheel, a combined sustaining and lifting connection between the supporting structure and the front of the carrying-structure, a vertical sliding-connection between the structures whereby they will be held against relative fore and aft movement, power-operated mechanism for operating said lifting connection, and means for locking the connection.

29. In a plow, the combination of carrying-wheels, a supporting-structure between and sustained by the carrying-wheels, a plow-carrying structure sustained at its rear by the rear wheel, a sliding connection between said structures, a raising and lowering connection between the supporting structure and the front of the carrying-structure, comprising a hand-lever and lock for adjusting the front end of the carrying-structure, and mechanism, operable by one of the carrying-wheels for operating the raising and lowering connection.

30. In a plow, the combination of front carrying-wheels, a rear carrying-wheel, a supporting-structure between and sustained by the front carrying-wheels, a plow-carrying structure sustained at its rear by the rear wheel, a vertical sliding-connection between the structures a raising and lowering connection between the supporting structure and the front of the carrying-structure, comprising a hand-lever and a lock for adjusting the front end of the carrying-structure, and mechanism, operable by one of the front carrying-wheels for operating the raising and lowering connection.

31. In a plow, the combination of carrying-wheels, a supporting-structure between and sustained by the carrying-wheels, a plow-carrying structure, a sliding-connection between the structures, a raising and lowering connection between the supporting structure and the front of the carrying-structure, comprising a crank, a link and a hand-lever for adjusting the front end of the carrying-structure, and a lock for the hand-lever, and mechanism operable by one of the carrying-wheels for operating said raising and lowering connection.

32. In a plow, the combination of carrying-wheels, a supporting-structure between and sustained by the carrying-wheels, a plow-carrying structure, a sliding-connection between the structures, a raising and lowering connection between the supporting-structure and the front of the carrying-structure, comprising a hand-lever for adjusting the front end of the carrying-structure, and a lock for the hand-lever, mechanism, operable by one of the carrying-wheels, for operating the raising and lowering connection, and an automatic lock for the connection.

33. In a plow, the combination of carrying-wheels, a supporting-structure between and sustained by the carrying-wheels, a plow-carrying structure, a raising and lowering connection between the supporting structure and the carrying-structure, comprising a screw for adjusting the connection, and mechanism, operable by one of the carrying-wheels for operating the connection.

34. In a plow, the combination of front carrying-wheels, a rear carrying-wheel, a supporting-structure between and sustained by the front carrying-wheels, a plow-carrying structure sustained at its rear by the rear wheel, a raising and lowering connection between the supporting structure and the front of the carrying-structure comprising a screw for adjusting the connection, and mechanism operable by one of the front carrying-wheels for operating the connection.

35. In a plow, the combination of carrying-wheels, a supporting-structure between and sustained by the carrying-wheels, a plow-carrying structure, a raising and lowering connection between the supporting-structure and the carrying-structure, comprising a pair of screws for adjusting the carrying-structure relatively to the connection, and mechanism, operable by one of the front carrying-wheels, for operating the connection.

36. In a plow, the combination of carrying-wheels, a supporting-structure between and sustained by the carrying-wheels, a plow-carrying structure, a raising and lowering crank-and-link connection between the supporting-structure and the front of the carrying-structure, comprising a screw for adjusting the carrying-structure relatively to the connection, and mechanism, operable by one of the front carrying-wheels, for operating the connection.

37. In a plow, the combination of carrying-wheels, a crank-shaft, a plow-carrying structure, a raising and lowering connection between the shaft and the front end of said structure, said shaft being adapted by rotation in one direction to alternately raise and lower the carrying structure, a lever secured on the shaft, a pair of dogs pivoted to the lever at diametrically opposite points, means on one of the carrying-wheels for rotating the dogs in one direction, a device whereby the dogs will be alternately shifted into operative position, and a spring lock for securing the lever alternately in two positions, said lever being provided with means for shifting the lock against the force of the spring.

38. In a plow, the combination of carrying-wheels, a crank-shaft sustained by said wheels, a plow-carrying structure, a raising and lowering connection between the shaft and said structure, said shaft being adapted by rotation in one direction to alternately raise and lower the carrying structure, a lever secured on, and to rotate with the shaft, a pair of dogs for rotating and mounted on said lever, means operated by one of the carrying-wheels for operating said dogs, and a guide for alternately holding said dogs in operative connection with said operating means during rotation of the shaft in the same direction, and a spring lock for securing the lever alternately in two positions, the lever being provided with means for shifting the lock against the force of the spring.

39. In a plow, the combination of carrying-wheels, a supporting-structure comprising a crank-axle journaled in one of the front-carrying wheels, a plow-carrying structure, a sliding-connection between said structures, a raising and lowering connection between the crank-axle and said structure, means for adjusting one side of the crank-axle vertically, and power-operated mechanism for operating the axle to operate said connection.

40. In a plow, the combination of a rigid carrying structure having a plurality of plow bodies fixedly mounted on the structure, supporting wheels at the sides of the frame respectively and adjustably connected to the frame, and a rotatable member, means to drive said member from one of the carrying wheels, a link between said member and the carrying structure, and means to lock the link so that it will be in substantially dead-center relation when the rotatable member is in position to hold the plow raised and when the plows are lowered.

41. In a gang plow, the combination of a rigid frame, a plurality of plow-bodies fixedly mounted on said frame, a supporting wheel adjustably mounted on said frame, and means connected with said wheel and positively driven by the rotation thereof adapted to adjust said wheel vertically relative to the frame, comprising a rotatable member and a link pivotally connected together and connected in series between said frame and said wheel adapted to stand substantially in dead-center relations when the supporting wheel is held in either its uppermost or its lowermost position.

42. In a "frameless" plow, the combination of a carrying structure having one or more plow-bodies rigidly connected thereto, wheels at the sides of the structure respectively, said wheels and said structure being relatively movable vertically, a draft-connection between the structure and the wheels and controllable means operable by power from one of said wheels to alternately and positively separate and bring together vertically the structure and said wheels.

43. In a "frameless" plow, the combination of a carrying structure having one or more plow-bodies rigidly connected thereto, wheels at the sides of the structure respectively, said wheels and said structure being relatively movable vertically, a draft connection between the structure and the wheels and controllable mechanism operable by power from one of said wheels for vertically separating and bringing together the structure and said wheels, comprising a rotatable element and means for imparting successive half revolutions in the same direction to said element to alternately and positively separate and bring together vertically the structure and the wheels.

44. In a plow, the combination of a carrying structure having one or more plow-bodies thereon, a pair of carrying wheels at the sides of the structure, an axle between said wheels, a draft-connection between the axle and said structure, and mechanism driven positively by power from one of said carrying wheels comprising a rotatable element, operable successive partial revolutions in the same direction and connected to positively raise and lower the structure.

45. In a plow, the combination of a pair of carrying-wheels, an axle supported by said wheels, and provided with a crank between said wheels, a plow carrying structure sustained on said crank, and controllable mechanism driven by one of said wheels for imparting successive half revolutions in the same direction to the crank to raise and lower the structure.

46. In a plow, the combination of a carrying structure having one or more plow-bodies rigidly connected thereto, supporting wheels at the sides of the structure being relatively shiftable vertically, and mechanism for effecting said relative vertical movement, comprising an intermittently operable clutch driven by one of said wheels and acting positively on successive half revolutions of the clutch to alternately separate and bring together vertically the structure and said wheels.

47. In a plow, the combination of a pair of supporting wheels, an axle supported on and extending and having a crank thereon between said wheels, a carrying structure to which one or more plow bodies are rigidly connected, raising and lowering connections between said crank and said structure, and means driven positively by power from one of said carrying wheels to operate the crank successive partial revolutions in the same direction to alternately raise and lower the structure.

48. In a plow, the combination of a pair of supporting wheels, an axle supported on and between said wheels, a carrying structure to which one or more plow-bodies are rigidly connected, a draft-connection between the axle and the structure, controllable mechanism driven positively by power from one of said carrying wheels, a rotatable element operable successive half revolutions in the same direction by said mechanism and a link operated by the successive movements of said element to alternately raise and lower the structure.

49. In a plow, the combination of a pair of carrying wheels, an axle supported on said wheels and formed with a completely rotatable cranked portion therebetween, a plow-carrying structure sustained on said cranked portion, a draft connection between the axle and the structure and trip-controlled mechanism for causing the axle to be driven by and turn with one of said wheels through a half revolution and for automatically locking the axle against further revolution when its cranked portion reaches vertical position.

WILLIAM W. CAMERON.

Witnesses:
C. F. Sutor,
A. J. Bruha.